United States Patent
Tochigi et al.

(10) Patent No.: US 7,032,487 B2
(45) Date of Patent: Apr. 25, 2006

(54) CORRUGATED FIN CUTTING DEVICE AND CUTTING METHOD

(75) Inventors: Kenji Tochigi, Nakano-ku (JP); Kimio Nozaki, Nakano-ku (JP); Akira Yoshikawa, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/763,167

(22) Filed: Jan. 26, 2004

(65) Prior Publication Data

US 2004/0149102 A1 Aug. 5, 2004

(30) Foreign Application Priority Data

Jan. 27, 2003 (JP) ............................. 2003-017356

(51) Int. Cl.
*B26D 7/06* (2006.01)

(52) U.S. Cl. ............................. 83/318; 83/56; 83/821

(58) Field of Classification Search ............... 83/437.4, 83/879, 438, 34–38, 216, 218, 236, 257, 83/263, 288, 353, 356.2, 298, 56, 318, 821; 72/185–187

See application file for complete search history.

(56) References Cited

U.S. PATENT DOCUMENTS

| 2,509,760 | A |   | 5/1950  | Crafton            |        |
|-----------|---|---|---------|--------------------|--------|
| 4,262,568 | A |   | 4/1981  | Wallis             |        |
| 4,480,456 | A |   | 11/1984 | Iwase et al.       |        |
| 4,507,948 | A | * | 4/1985  | Wallis ............ | 72/185 |
| 4,523,500 | A | * | 6/1985  | Maruyama ........   | 83/37  |
| 5,138,861 | A | * | 8/1992  | Wallis ............ | 72/185 |
| 5,207,083 | A |   | 5/1993  | Bongiovanni et al. |        |
| 6,430,983 | B1|   | 8/2002  | Nozaki et al.      |        |

FOREIGN PATENT DOCUMENTS

| JP | 4-289017   | 10/1992 |
|----|------------|---------|
| JP | 5-23912    | 2/1993  |
| JP | 10-309620  | 11/1998 |
| JP | 10-309621  | 11/1998 |
| JP | 2001-79711 | 3/2001  |
| JP | 2002-109509| 4/2002  |

\* cited by examiner

*Primary Examiner*—Allan N. Shoap
*Assistant Examiner*—Phong Nguyen
(74) *Attorney, Agent, or Firm*—Wenderoth, Lind & Ponack, L.L.P.

(57) ABSTRACT

A corrugated fin cutting device includes a pair of worms that restrains a position of a bottom portion of a corrugated fin material that is being continuously conveyed in a conveying direction, and a guide piece that approaches the bottom portion of the fin material that is being restrained by the pair of worms to determine a position of this bottom portion and moves in the conveying direction in synchronization with the fin material. Further, the corrugated fin cutting device includes cutting blades that move with the guide piece in the conveying direction and cut the bottom portion of the fin material that is positioned by the guide piece. The bottom portion of the fin material is cut when the guide piece passes the worms.

2 Claims, 6 Drawing Sheets

CORRUGATED FIN CUTTING DEVICE AND CUTTING METHOD

BACKGROUND OF THE INVENTION

1. Field of the Invention

The present invention relates to a corrugated fin cutting device and cutting method for cutting a corrugated fin material, which is continuously conveyed, to obtain a corrugated fin.

2. Description of the Related Art

A conventional corrugated fin cutting device is disclosed in Japanese Patent Laid-open No. Tokkaihei 5-23912. This corrugated fin cutting device utilizes counting worms constituted of a pair of worms twisted in the right and left directions engaging respectively with both shoulder portions of the corrugated fin material and conveying the fin material in a conveying direction while counting the number of ridges of the fin material.

Further, another conventional corrugated fin cutting device is disclosed in Japanese Patent Laid-open No. Tokkai 2002-109509. In this corrugated fin cutting device, the aforementioned both worms convey the fin material by a predetermined number of ridges and then stops it, and movable cutting blades mounted on the tips of both of the worms are quickly brought down to cut the fin material, to thereby obtain a corrugated fin having a predetermined length.

However, in the conventional corrugated fin cutting devices, since both of the worms repeat conveying and stopping of the fin material, there exists a problem that the fin material may expand or contract so as to heavily contact both of the worms, thereby damaging or twisting the fin material and causing a cutting defect.

Incidentally, when such a problem occurs, it is possible that end portions of the corrugated fins become irregular when they are assembled with a core to cause an appearance defect, or to cause a defect on ajoint condition between a sheet plate of a radiator or the like and a tube.

The present invention is made in view of the above-mentioned problems, and an object thereof is to provide a corrugated fin cutting device and cutting method that realize high product precision and improvement in productivity of corrugated fins by surely cutting the fin material at a predetermined position without stopping the fin material that is continuously conveyed or without causing the fin material to be damaged or twisted by the worms.

SUMMARY OF THE INVENTION

A corrugated fin cutting device according to the present invention comprises: a position restraining unit that restrains a position of a bottom portion of a corrugated fin material that is being continuously conveyed in a conveying direction; a position determining unit that approaches the bottom portion of the fin material to determine a position and moves in the conveying direction in synchronization with the fin material that is being conveyed; and a cutting unit that moves with the position determining unit in the conveying direction and cuts the bottom portion of the fin material at the position determined by the position determining unit.

In this corrugated fin cutting device, the position restraining unit restrains the position of the bottom portion of the corrugated fin material that is being continuously conveyed in the conveying direction, and the position determining unit approaches the bottom portion of the fin material to determine a cutting position of the fin material and moves in the conveying direction in synchronization with the fin material.

Further, after the cutting unit moves with the position determining unit in the conveying direction, the cutting unit cuts the bottom portion of the fin material at the position determined by the position determining unit, to thereby obtain a corrugated fin having a predetermined length.

Therefore, the fin material can be surely cut at the predetermined position without stopping the fin material that is being continuously conveyed, which prevents the fin material from expanding and contracting, so that the high product precision and improvement in productivity of the corrugated fin can be realized.

Another corrugated fin cutting device according to the present invention comprises: a pair of worms that engages respectively with both shoulder portions of corrugated fin material and continuously conveys the fin material in a conveying direction; a guide piece that approaches the bottom portion of the fin material that is being engaged with the both worms to determine a position and moves in the conveying direction in synchronization with the fin material that is being conveyed; and the cutting blades that move with the guide piece in the conveying direction of the fin material and cut the bottom portion of the fin material that is guided by the guide piece when the guide piece passes the both worms.

In this corrugated fin cutting device, the pair of worms engages respectively with both the shoulder portions of the fin material and continuously conveys the fin material in the conveying direction.

When the fin material is conveyed by the predetermined number of bottom portions, the guide piece approaches the bottom portion of the fin material engaged with the both worms to determine a cutting position of the bottom portion, and the guide piece and the cutting blades move in the conveying direction in synchronization with the fin material.

When the guide piece passes the both worms, the cutting blades cut the fin material at the bottom portion of the fin material that is guided by the guide piece to obtain the corrugated fin having a predetermined length.

Therefore, the guide piece surely approaches the bottom portion of the fin material, which is adjusted by the both worms engaging with the both shoulder portions, so that the cutting position of the fin material can be easily determined.

Further, since the guide piece and the cutting blades move in the conveying direction in synchronization with the fin material and cut the fin material during the movement, it is not necessary to stop the fin material as needed in a conventional corrugated fin cutting device, which prevents the fin material from expanding and contracting, so that the high product precision and improvement in productivity of the corrugated fin can be realized.

A corrugated fin cutting method according to the present invention comprises: a position restraining step of restraining by a position restraining unit a position of a bottom portion of a corrugated fin material that is being continuously conveyed in a conveying direction; a position determining step of determining a position of the bottom portion of the restrained fin material by a guide piece approaching the bottom portion, and then moving the guide piece in synchronization with the fin material in the conveying direction; and a cutting step of moving cutting blades with the guide piece in the conveying direction, and cutting by the cutting unit the bottom portion of the fin material at the position determined by the guide piece.

In this corrugated fin cutting method, in the position restraining step, the position of the bottom portion of the corrugated fin material that is being continuously conveyed in the conveying direction is restrained, and in the position determining step, the guide piece approaches the bottom portion of the restrained fin material to determine the position of the bottom portion, and the guide piece is moved in the conveyed direction in synchronization with the fin material.

In the subsequent cutting step, the cutting unit is moved with the guide piece in the conveying direction, and cuts the bottom portion of the fin material at the position determined by the guide piece.

Therefore, since the guide piece and the cutting unit move in the conveying direction in synchronization with the corrugated fin material that is continuously conveyed in the conveying direction, and the cutting unit cuts the bottom portion of the fin material that is guided by the guide piece during the movement, the corrugated fin having a predetermined length can be obtained without stopping the conveyance of the fin material as needed in the conventional invention.

Preferably, in the cutting step, the cutting unit cuts the bottom portion of the fin material after the guide piece passes the position restraining unit.

Thus, since the cutting unit cuts the bottom portion of the fin material after the guide piece passes the position restraining unit in the cutting step, it is possible to assure the size of engagement with the fin material by which the position restraining unit can surely restrain the position of the fin material, and at the time of cuffing, the cuffing blades can surely cut the bottom portion of the fin material without interfering with the position restraining unit.

DETAILED DESCRIPTION OF THE PREFERRED EMBODIMENTS

Hereinafter, a corrugated fin cutting device according to an embodiment of the present invention will be described with reference to the drawings.

Figure 1:
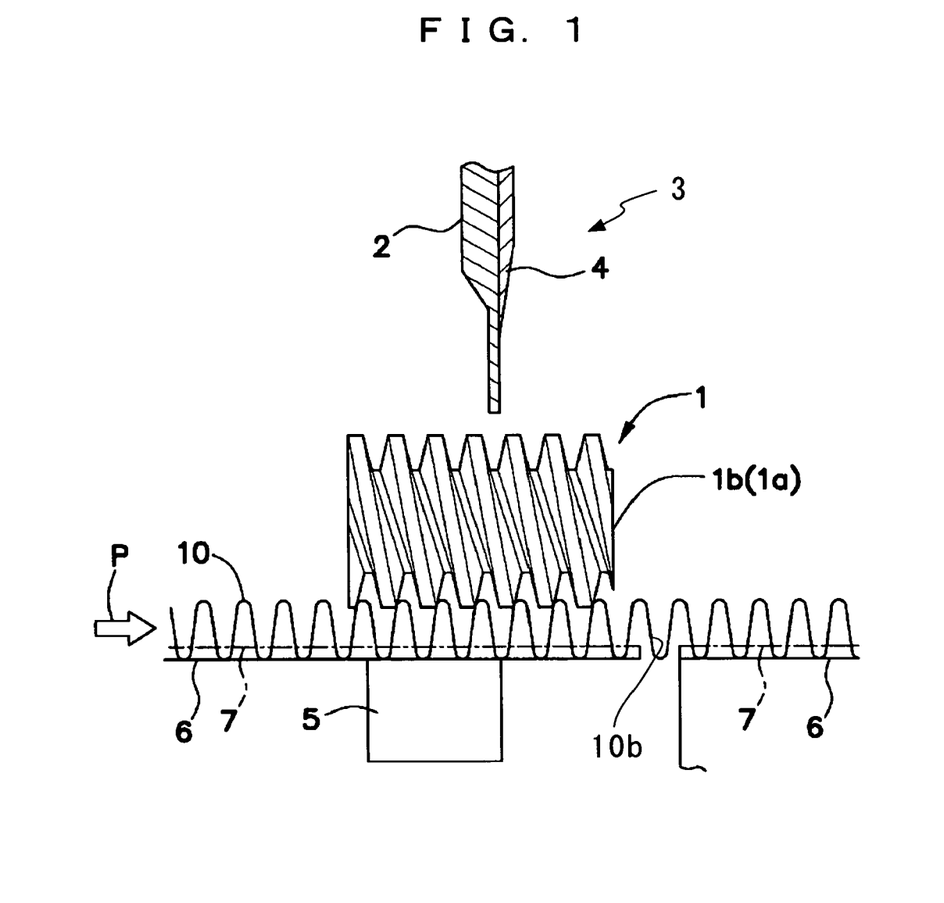
FIG. 1 is a side view of the corrugated fin cutting device according to an embodiment of the present invention.
Figure 2:
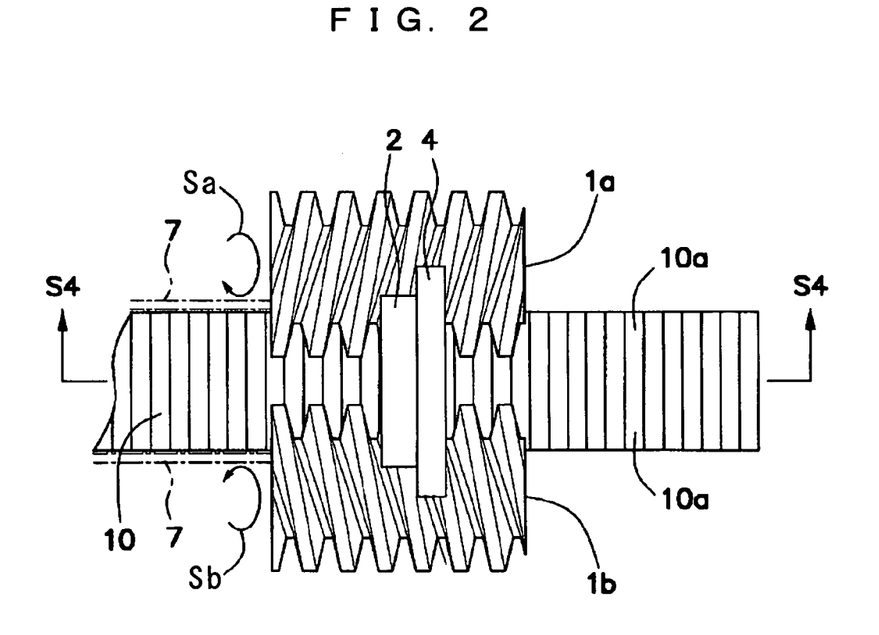
FIG. 2 is a plan view showing a positional relationship between worms, a guide piece, movable cutting blades, and fin material in the corrugated fin cutting device in FIG. 1.
Figure 3:
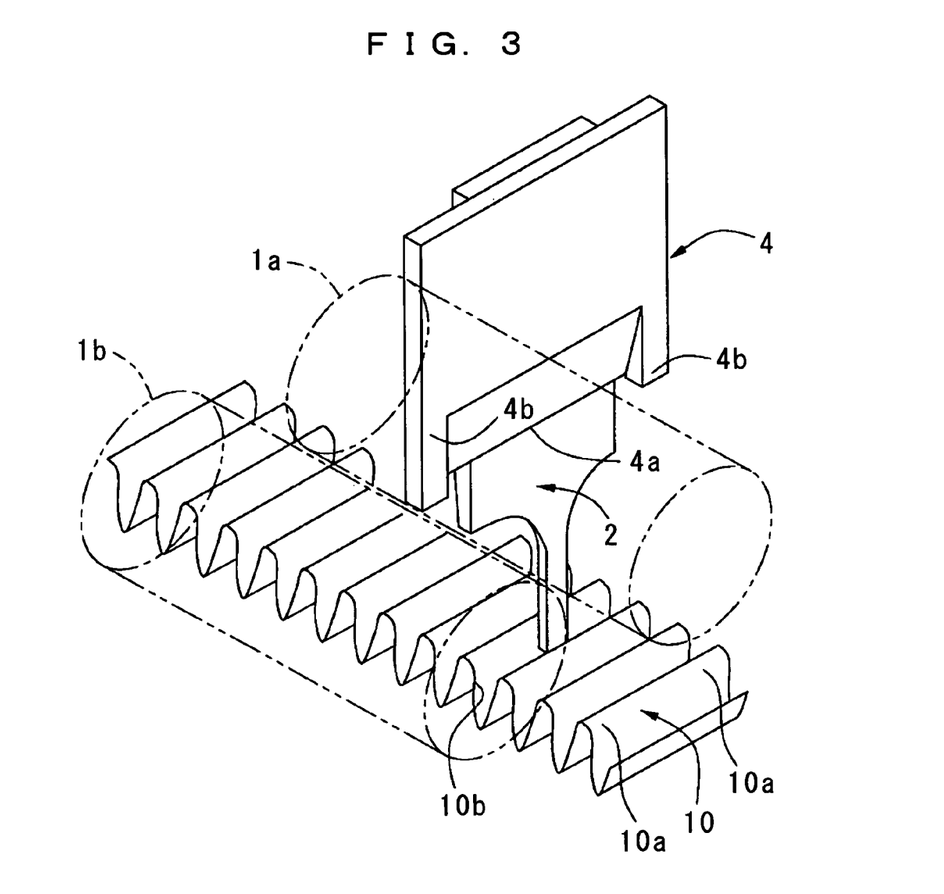
FIG. 3 is a perspective view of movable cutting blades and a guide peace in the corrugated fin cutting device in FIG. 1.
Figure 4:
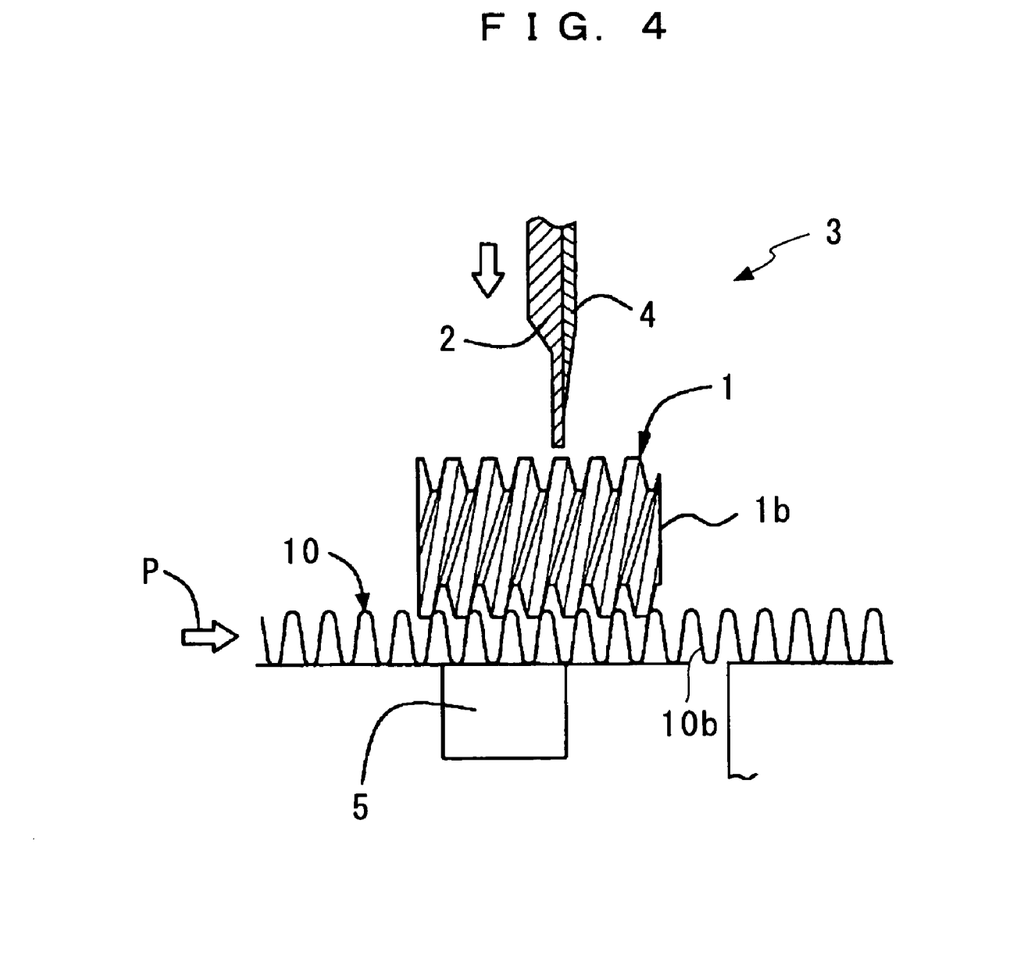
FIG. 4 is a view describing an operation of the corrugated fin cutting device, which is cross-sectionally shown along a line S4 to S4 in FIG. 2, before the guide piece moves down to a bottom portion of the fin material.
Figure 5:
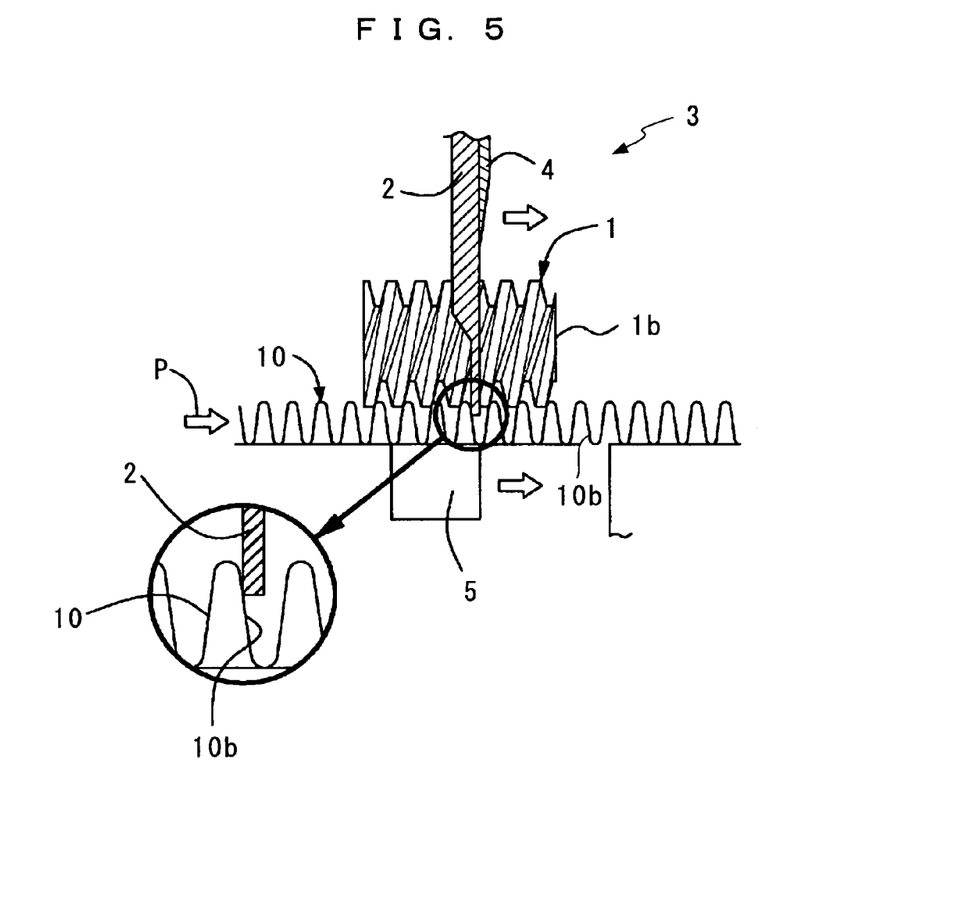
FIG. 5 is a view describing operation of the corrugated fin cutting device, which is cross-sectionally shown along the line S4 to S4 in FIG. 2, when the guide piece moves down to the bottom portion of the fin material to determine a position.
Figure 6:
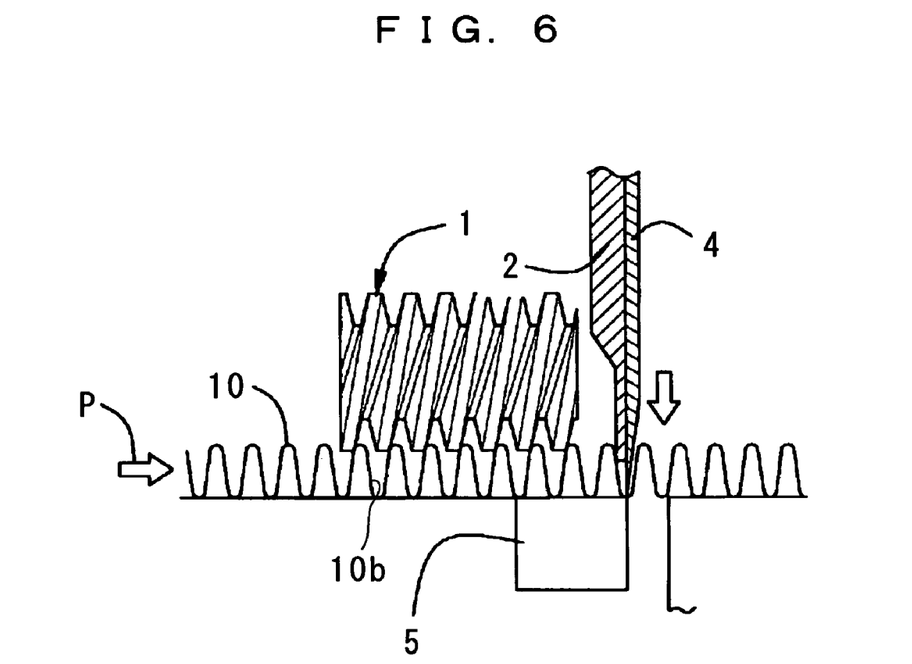
FIG. 6 is a view describing operation of the corrugated fin cutting device, which is cross-sectionally shown along the line S4 to S4 in FIG. 2, when a cutting unit moves down to cut the bottom portion of the fin material.

FIG. 1 is a side view of the corrugated fin cutting device according to the embodiment of the present invention, and FIG. 2 is a plan view showing a positional relationship between worms and fin material in the corrugated fin cuffing device according to this embodiment. FIG. 3 is a perspective view of movable cutting blades and its guide, and FIG. 4 to FIG. 6 are views respectively describing an operation of the corrugated fin cutting device along a line S4 to S4 in FIG. 2.

As shown in FIG. 1 and FIG. 2, the corrugated fin cuffing device according to this embodiment is mainly constituted by a pair of worms 1 that convey a corrugated fin material 10 made of a metal sheet and determine a position of a bottom portion 10$b$ of the fin material 10, a guide piece 2, and movable cutting blades 3 that cut the fin material 10 at a position of the guide piece 2. Note that the worms 1, the guide piece 2, and the cuffing blades 3 function as a position restraining unit of the present invention, a positioning unit of the present invention, and a cutting unit of the present invention respectively.

The worms 1 continuously convey the fin material 10 on a conveying table 6 in a conveying direction, which is the direction of an arrow P in FIG. 1, by rotating of the worms in rotational directions opposite to each other, which are the rotational directions shown by arrows Sa and Sb in FIG. 2. The worms 1 are constituted by a worm 1$a$ with right-hand teeth and a worm 1$b$ with left-hand teeth that restrain the position of the bottom portion of the fin material 10 while conveying the fin material 10. Both of these worms 1$a$ and 1$b$ engage respectively with both shoulder portions 10$a$ of the fin material 10, which are set to have the same pitch as that of a corrugated fin to be manufactured, in order to restrain the position of the bottom portion 10$b$ of fin material 10.

Further, the worms 1$a$ and 1$b$ are coupled by a gear, not shown, and is driven by a servomotor, not shown to rotate respectively. A control unit, not shown, can count the number of bottom portions 10$b$ of the conveyed fin material 10 from the number of rotation of at least one of these worms 1$a$ and 1$b$.

As shown in FIG. 3, the guide piece 2 is for guiding a movable cutting blade 4 arranged above the fin material 10 to a cutting position of the fin material 10, and its downside portion is formed in curves to avoid the worms 1$a$ and 1$b$, and a tip thereof is formed to have a thickness and a width capable of approaching the bottom portion 10$b$ of the fin material 10 between the worm 1$a$ and the worm 1$b$.

The cutting blades 3 are, as shown in FIG. 1, constituted by the movable cutting blade 4 arranged above the fin material 10 and a fixed cutting blade 5 arranged below the fin material 10 at a position corresponding to that of the movable cutting blade 4.

The movable cutting blade 4 is used for cutting the fin material 10 by moving down along the guide piece 2, and has, as shown in FIG. 3, a blade portion 4$a$ that is formed on its downside, and reinforcing portions 4$b$ and 4$b$ that are formed thicker than the blade portion 4$a$ and arranged at both sides of the blade portion 4$a$.

Furthermore, the guide piece 2 and the cutting blades 3 are mounted on a traveling carriage, not shown, and provided on the conveying table 6 to be movable in a conveying direction of the fin material 10 by a cam, not shown, linked to the traveling carriage, and is controlled to be movable in synchronization with the fin material 10 conveyed according to the rotations of the worms 1$a$ and 1$b$. Incidentally, fin guides 7 that guide both sides of the fin material 10 are provided.

Hereinafter, operation of the corrugated fin cutting device according to this embodiment will be described based on FIGS. 4 to 6.

In the corrugated fin cutting device according to this embodiment, first, the fin material 10 is supplied and conveyed on the conveying table 6 by the worms 1, and then in a position restraining step, as shown in FIG. 4, the worms 1 engage with the bottom portion 10b of the fin material 10 and restrain the position of the engaged bottom portion 10b. Further, at this time, the control unit counts the number of bottom portions 10b of the fin material 10 from the rotation of the worms 1.

Next, in a position determining step, as shown in FIG. 5, when the fin material 10 is conveyed by the predetermined number of bottom portions 10b by the worms 1 and then a position of the bottom portion 10b to be cut is determined, the guide piece 2 approaches the determined position of the bottom portion 10b of the fin material 10 that is engaged with the worms 1. This approach is made while the fin material 10 is conveying without being stopped.

At this time, since the worms 1 are restraining the position of the bottom portion 10b of fin material 10 by engaging with both shoulder portions 10a of the fin material 10, the guide piece 2 surely approaches the bottom portion 10b of the fin material 10.

When the position determination by the guide piece 2 is completed, the control unit resets the counted number of ridges of the worms 1, and starts counting from a bottom portion that is more upstream by one from the bottom portion 10b.

On the other hand, the guide piece 2 that has approached the bottom portion 10b of the fin material 10 moves in the conveying direction in synchronization with the fin material 10. At this time, the cutting blades 3 move with the guide piece 2 in the conveying direction.

Next, in a cutting step, as shown in FIG. 6, when the guide piece 2 passes the worms 1, the movable cutting blade 4 moves down along the guide piece 2 to cut the bottom portion 10b, to thereby obtain a corrugated fin 111 having a predetermined length.

Incidentally, after the movable blade 4 cuts the fin material 10, the guide piece 2, the movable cutting blade 4, and the fixed cutting blade 5 return to their original positions and then wait until the fin material 10 is conveyed again by the worms 1 by the predetermined number of ridges. Incidentally, during all of these steps, the fin material 10 is continuously conveyed without being stopped.

Therefore, in the corrugated fin cutting device according to this embodiment, with respect to the fin material 10 continuously conveyed by the worms 1 in the conveyed direction, the guide piece 2 approaches the cutting position of the fin material 10, and this guide piece 2 moves in the conveying direction with the cutting blades 3 in synchronization with the fin material 10. During this movement, the cutting blades 3 cut the fin material at the cutting position. Therefore, as compared to the conventional corrugated fin cutting device, the fin material 10 is cut at a predetermined position without stopping the conveyance of the fin material 10, so that the corrugated fin 11 having a predetermined length can be obtained in a short period of time, thereby contributing to the improvement in productivity of the corrugated fin.

In this case, the fin material does not expand or contract to heavily contact the worms 1 by being stopped in the middle similarly to the conventional corrugated fin cutting device, so that a fin material in a desired form can be formed stably. As a result, the corrugated fin 11 having high product precision can be obtained.

The embodiment of the present invention has been described above, but the specific structure of the present invention is not limited to this embodiment. The present invention includes any change in design without departing from the gist of the invention.

For example, in this embodiment, the bottom portion 10b of the fin material 10 is counted by the worms 1 as a timing for the guide piece 2 to approach the bottom portion 10b of the fin material 10, but the guide piece 2 may be inserted by an interval of predetermined unit time.

Further, it is needless to mention that the moving ranges for moving the guide piece 2 and the cutting blades 3 in synchronization with the fin material 10 can be set according to each case.

The cutting unit may be constructed so that it moves at first independently from the guide piece 2, not moving together with the guide piece 2, to the guide piece 2 and then moves with the guide piece 2 while cutting the bottom portion 10b, determined by the guide piece 2, of fin material 10.

The entire contents of Japanese Patent Application Tokugan 2003-017356 (filed Jan. 27, 2003) are incorporated herein by reference.

What is claimed is:

1. A corrugated fin cutting device comprising:

a pair of worms engageable with a corrugated fin material that is being continuously conveyed in a conveying direction and has a bottom portion located at a position of a predetermined conveying-directional length to be cut of the corrugated fin material, said worms being operable to restrain a position of the bottom portion by engaging with both sides of shoulder portions of the corrugated fin material;

a guide piece having a top portion smaller in width than a space formed between said worms so that the top portion is insertable between adjacent shoulder portions of the corrugated fin material sandwiching the bottom portion to approach the bottom portion for determining the position of the bottom portion to be cut in a state where the bottom portion is restrained by said worms and located between said worms with the corrugated fin material being conveyed, said guide piece being capable of moving in the conveying direction in synchronization with the corrugated fin material that is being conveyed; and a cutting blade movable in the conveying direction and along said guide piece in a cutting direction perpendicular to the conveying direction to cut the bottom portion of the corrugated fin material in a state where said guide piece is inserted between the adjacent shoulder portions of the conveying corrugated fin material after said cutting blade passes said worms.

2. A corrugated fin cutting method comprising:

engaging a pair of worms and both sides of shoulder portions of a corrugated fin material that is being continuously conveyed in a conveying direction and has a bottom portion located at a position of a predetermined conveying-directional length to be cut of the corrugated fin material to restrain a position of the bottom portion;

moving a guide piece in the conveying direction in synchronization with the fin material that is being conveyed, the guide piece having a top portion smaller in width than a space formed between the worms so that the top portion is insertable between adjacent shoulder portions of the corrugated fin material sandwiching the bottom portion to approach the bottom portion for determining the position of the bottom portion to be cut in a state where the bottom portion is restrained by the worms and located between the worms with the corrugated fin material being conveyed;

moving a cutting blade in the conveying direction; and moving the cutting blade along the guide piece in a cutting direction perpendicular to the conveying direction after the cutting blade passes the worms so as to cut the bottom portion of the corrugated fin material in a state where the guide piece is inserted between the adjacent shoulder portions of the corrugated fin material while the corrugated fin material is being conveyed in the conveying direction.

* * * * *